United States Patent
Tanaka

(10) Patent No.: US 10,182,106 B2
(45) Date of Patent: Jan. 15, 2019

(54) DATA MANAGEMENT SYSTEM, INFORMATION MANAGEMENT APPARATUS, AND NON-TRANSITORY COMPUTER READABLE MEDIUM

(71) Applicant: FUJI XEROX CO., LTD., Tokyo (JP)

(72) Inventor: Kazuya Tanaka, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 259 days.

(21) Appl. No.: 14/953,575

(22) Filed: Nov. 30, 2015

(65) Prior Publication Data
US 2016/0344802 A1    Nov. 24, 2016

(30) Foreign Application Priority Data
May 22, 2015  (JP) ................................. 2015-104368

(51) Int. Cl.
  G06F 15/16    (2006.01)
  H04L 29/08    (2006.01)

(52) U.S. Cl.
  CPC .................................... H04L 67/10 (2013.01)

(58) Field of Classification Search
  CPC ............... G06F 19/322; G06F 21/6245; Y10S 707/99931; H04L 63/0876; H04L 67/10
  See application file for complete search history.

(56) References Cited

U.S. PATENT DOCUMENTS

| | | | | |
|---|---|---|---|---|
| 2003/0236933 A1* | 12/2003 | Shigeta | ................... | G06F 11/14 710/72 |
| 2007/0055674 A1* | 3/2007 | Sunada | ............. | G06F 17/30011 707/999.01 |
| 2011/0078286 A1* | 3/2011 | Nishino | ............. | H04N 1/00127 709/219 |
| 2012/0047460 A1* | 2/2012 | McCann | ............. | G06F 3/04812 709/207 |

(Continued)

FOREIGN PATENT DOCUMENTS

JP    2008-129643 A    6/2008

*Primary Examiner* — Liang Che A Wang
*Assistant Examiner* — Ayele F Woldemariam
(74) *Attorney, Agent, or Firm* — Sughrue Mion, PLLC

(57) ABSTRACT

A data management system includes an information management apparatus including an acquisition unit, a first transmission unit, and a second transmission unit, and an information processing apparatus including a first reception unit and a second reception unit. The acquisition unit acquires target-user identification information and data made available to a target user. If data-group identification information has not been transmitted to the information processing apparatus of the target user, the first transmission unit transmits the data-group identification information to the information processing apparatus. If the first transmission unit has transmitted the data-group identification information to the information processing apparatus of the target user, the second transmission unit transmits a data provision notification to the information processing apparatus. The first reception unit receives the data-group identification (Continued)

information from the information management apparatus. The second reception unit receives the data provision notification from the information management apparatus.

3 Claims, 15 Drawing Sheets

(56) References Cited

U.S. PATENT DOCUMENTS

| | | | |
|---|---|---|---|
| 2013/0014112 A1* | 1/2013 | Nishida | G06F 3/1204 718/100 |
| 2013/0268587 A1* | 10/2013 | Ueda | G06Q 10/00 709/203 |
| 2014/0188698 A1* | 7/2014 | Takeshita | G06Q 20/0655 705/39 |
| 2015/0262219 A1* | 9/2015 | Vock | G06Q 30/0242 705/14.41 |

* cited by examiner

FIG. 3

| ASSOCIATION ID | DOCUMENT ID | PROVISION TARGET ID | TRAY ID | ACQUISITION FLAG | PROVISION DATE | PROVISION PERIOD |
|---|---|---|---|---|---|---|
| 0001 | Document-1 | User-1 | Tray-1 | Done | 01/30/2015 11:00:00 | 5 DAYS |
| 0002 | Document-2 | User-1 | Tray-1 | Done | 01/30/2015 11:00:00 | 5 DAYS |
| 0003 | Document-1 | User-2 | Tray-2 | Done | 01/22/2015 12:00:00 | 5 DAYS |
| 0004 | Document-3 | User-2 | Tray-2 | Done | 01/22/2015 12:00:00 | 5 DAYS |
| 0005 | Document-4 | User-3 | Tray-3 | Done | 01/21/2015 12:00:00 | 5 DAYS |
| 0006 | Document-4 | User-2 | Tray-2 | UnDone | 01/21/2015 12:00:00 | 5 DAYS |
| 0007 | Document-5 | User-4 | Tray-4 | UnDone | 01/22/2015 12:00:00 | XX DAYS (INDEFINITE PERIOD) |

DATA MANAGEMENT SYSTEM, INFORMATION MANAGEMENT APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-104368 filed May 22, 2015.

BACKGROUND

Technical Field

The present invention relates to a data management system, an information management apparatus, and a non-transitory computer readable medium.

SUMMARY

According to an aspect of the invention, there is provided a data management system including an information management apparatus including an acquisition unit, a first transmission unit, and a second transmission unit, and an information processing apparatus including a first reception unit and a second reception unit. The acquisition unit acquires target-user identification information identifying a target user to whom at least one piece of data is made available and acquires the piece of data made available to the target user. The target user corresponds to the information processing apparatus. In a case where data-group identification information assigned to one or more pieces of data made available to at least one user has not been transmitted to the information processing apparatus of the target user, the first transmission unit transmits the data-group identification information to the information processing apparatus. In a case where the first transmission unit has transmitted the data-group identification information to the information processing apparatus of the target user, the second transmission unit transmits a data provision notification to the information processing apparatus, the data provision notification notifying the target user that the piece of data has been made available. The first reception unit receives the data-group identification information from the information management apparatus. The second reception unit receives the data provision notification from the information management apparatus.

BRIEF DESCRIPTION OF THE DRAWINGS

Exemplary embodiments of the present invention will be described in detail based on the following figures, wherein:

FIG. 3 is a diagram illustrating an example of tray-association information managed by a tray-association management unit of a server apparatus according to the first exemplary embodiment of the invention;

DETAILED DESCRIPTION

First Exemplary Embodiment

Figure 1:
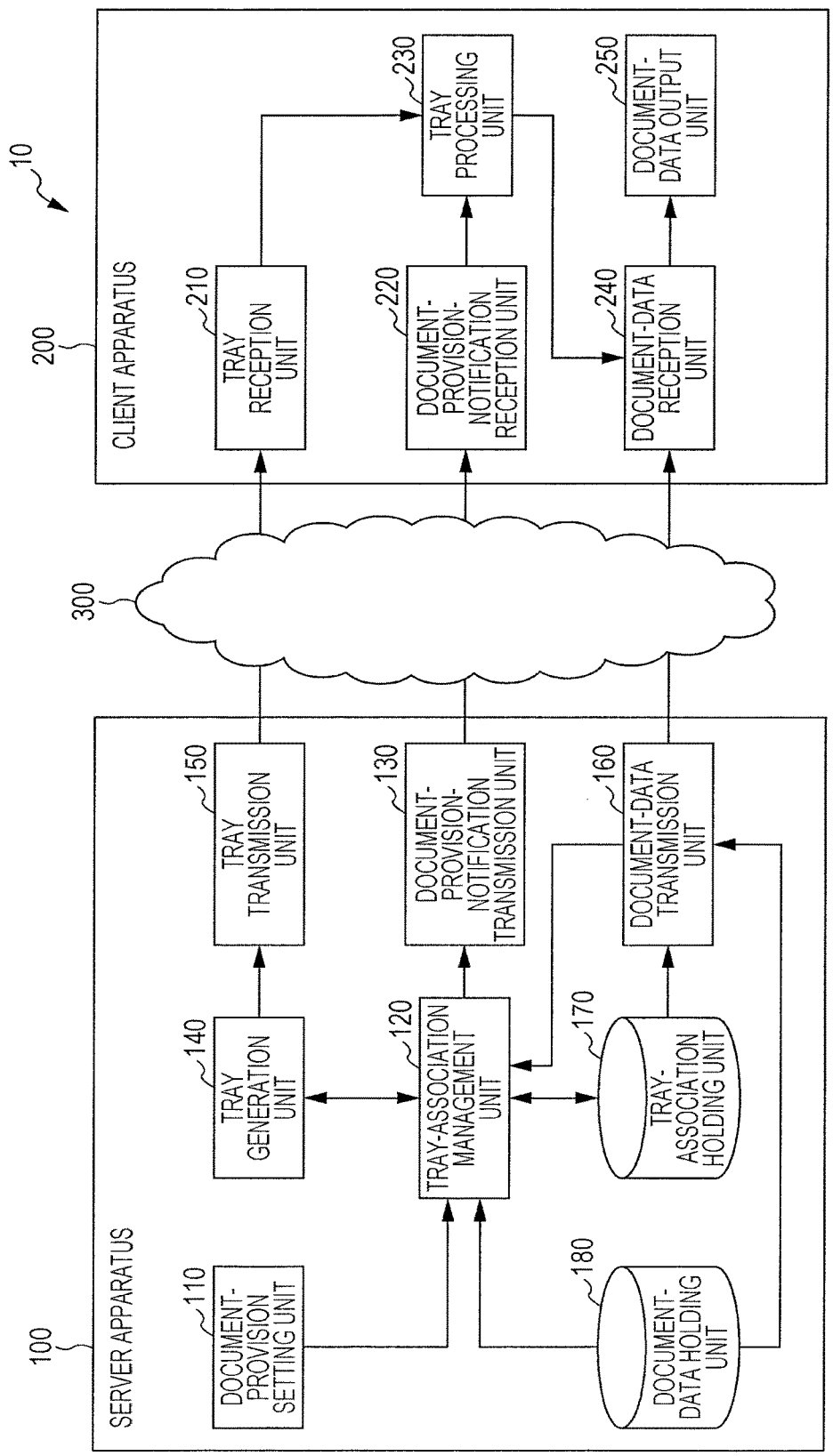
FIG. 1 is a diagram illustrating the configuration of a data management system according to a first exemplary embodiment of the invention.

FIG. 1 is a diagram illustrating the configuration of a data management system 10 according to a first exemplary embodiment of the invention. The data management system 10 includes a server apparatus 100 and a client apparatus 200 connected to each other through the Internet 300. The server apparatus 100 and the client apparatus 200 are each an information processing apparatus such as a personal computer. The server apparatus 100 holds document data, and the client apparatus 200 acquires the document data held by the server apparatus 100 and displays the content of the document data, for example, on the display screen of the client apparatus 200.

A document-data management (provision) process performed by the data management system 10 will be described. The server apparatus 100 holds document data. A document provider or the like inputs information designating document data and a user to whom the document data is made available (hereinafter, referred to as a target user). In response to the input, the server apparatus 100 transmits the document data and thereby provides the document data to the client apparatus 200.

Figure 2:
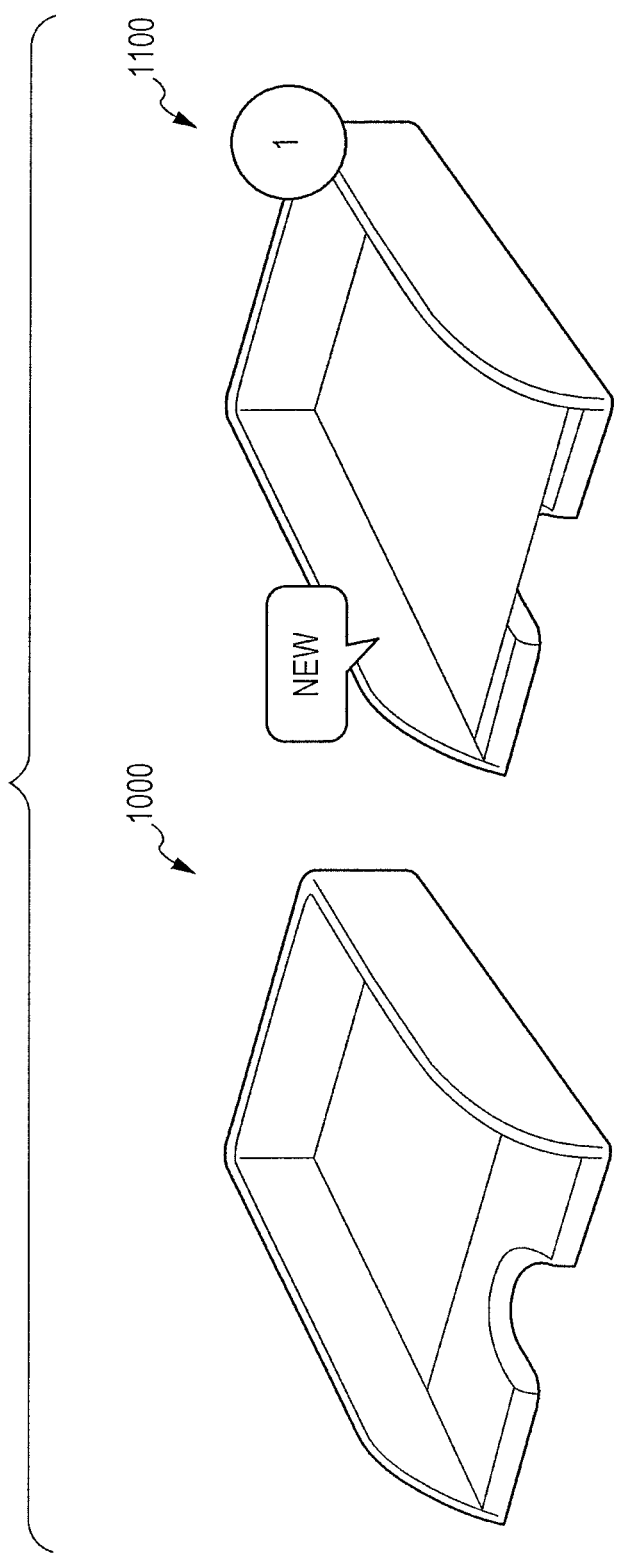
FIG. 2 is a diagram illustrating examples of icons displayed by the data management system according to the first exemplary embodiment of the invention.

When making document data available to a specific target user the first time, the server apparatus 100 transmits a program for displaying an icon on a display screen of the client apparatus 200 used by the target user. When the target user clicks the icon, the client apparatus 200 accesses a site (tray) having a list of pieces of document data made available to the target user. When the target user further clicks on a document data name in the site, a corresponding one of the pieces of document data is downloaded to the client apparatus 200 and displayed on the display screen of the client apparatus 200. When document data is newly made available to the target user, the icon additionally displays an indicator for the provision of the new document data. FIG. 2 is a diagram illustrating examples of icons 1000 and 1100 displayed by the data management system 10 according to the first exemplary embodiment of the invention. If new available document data is not present, the icon 1000 is displayed. If new available document data is present, the icon 1100 indicating the presence of the available document data and the number of pieces of available document data is displayed. The document-data management (provision) process is executed in this manner by the data management system 10.

The server apparatus 100 will be described in detail. The server apparatus 100 includes a document-provision setting unit 110, a tray-association management unit 120, a document-provision-notification transmission unit 130, a tray generation unit 140, a tray transmission unit 150, a document-data transmission unit 160, a tray-association holding unit 170, and a document-data holding unit 180. The document-provision setting unit 110, the tray-association management unit 120, the document-provision-notification transmission unit 130, the tray generation unit 140, the tray transmission unit 150, and the document-data transmission unit 160 are implemented as functions of a central processing unit (CPU) 104 run by a program stored in a memory 105 (not illustrated). The tray-association holding unit 170 and the document-data holding unit 180 are configured using a storage device such as a memory.

The document-provision setting unit 110 acquires target-user identification information identifying a user to whom document data is made available (target user), document-data designation information identifying the document data made available, provision-period information indicating a period of time for provision, and other information in accordance with an operation performed by a user of the server apparatus 100 (document-data provider). The document-provision setting unit 110 outputs the acquired information to the tray-association management unit 120. The target-user identification information is, for example, an e-mail address of the target user, and the document-data designation information is information designating one of pieces of document data held in the document-data holding unit 180.

The tray-association management unit 120 manages information (tray-association information) in which pieces of information are associated with each other. The pieces of information are a provision target ID (user identification information) identifying a user, a tray ID (data-group identification information) assigned to one or more pieces of document data made available to the user, a document ID (document identification information) identifying a corresponding one of the pieces of document data made available to the user, information indicating a provision period, and other information. FIG. 3 is a diagram illustrating an example of the tray-association information managed by the tray-association management unit 120 of the server apparatus 100 according to the first exemplary embodiment of the invention. Note that an acquisition flag indicates whether document data made available has been acquired by a target user. The tray-association information is stored in the tray-association holding unit 170.

When the document-provision setting unit 110 acquires the target-user identification information, the document-data designation information, and the provision-period information, the tray-association management unit 120 refers to the tray-association information stored in the tray-association holding unit 170 and checks whether the provision target ID corresponding to the target user identified by the target-user identification information is stored in the tray-association information. If the provision target ID is stored, the tray-association management unit 120 adds, to the tray-association information, the information regarding the document data newly made available. In addition, the tray-association management unit 120 outputs the corresponding data-group identification information and the information indicating the available document data to the document-provision-notification transmission unit 130.

In contrast, if the provision target ID is not stored, the tray-association management unit 120 instructs the tray generation unit 140 to generate information for displaying the tray on the terminal of the user. The tray-association management unit 120 adds user identification information, a tray ID newly generated by the tray generation unit 140 (described later), and a document ID to the tray-association information stored in the tray-association holding unit 170.

Figure 17B:
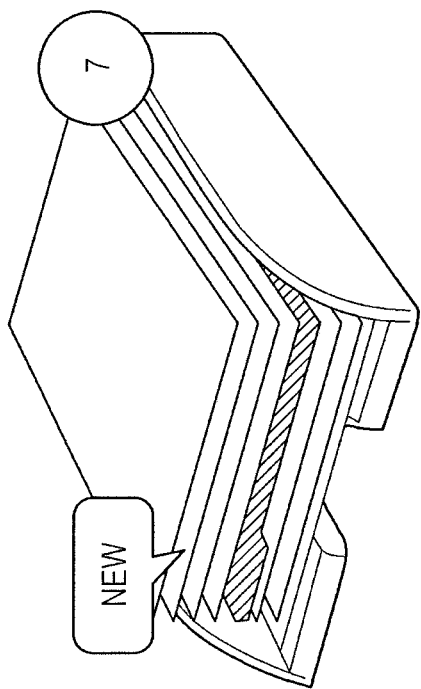
FIGS. 17A and 17B are each a diagram illustrating an example of an icon displayed in the data management system according to the first exemplary embodiment of the invention.
Figure 17A:
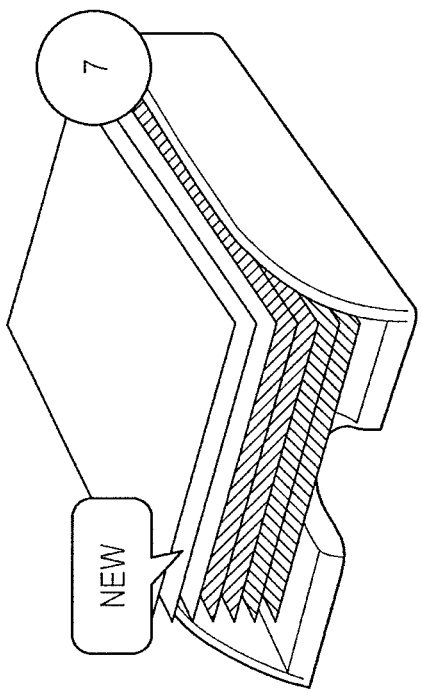

The document-provision-notification transmission unit 130 notifies, on the basis of the information input from the tray-association management unit 120, the client apparatus 200 that the document data has been newly made available. Specifically, the document-provision-notification transmission unit 130 transmits information for displaying, on the client apparatus 200, the icon 1100 indicating the presence of new available document data. The document-provision-notification transmission unit 130 may transmit information for displaying, on the client apparatus 200, an icon indicating the presence of available document data on the basis of provision-period information. For example, the color of a document in the display icon may be changed with the elapse of the provision period, as illustrated in FIG. 17A. Alternatively, the document display icon may be displayed with a divider based on provision periods, as illustrated in FIG. 17B.

The tray generation unit 140 assigns a tray ID to one or more pieces of data made available to a target user. Specifically, in accordance with the instruction from the tray-association management unit 120, the tray generation unit 140 generates an ID (tray ID) of a site (tray) where document data made available to the target user is displayed and generates a file describing the site. The tray generation unit 140 also generates a program for displaying the icon 1000 or 1100 for accessing the tray. The tray generation unit 140 generates as the tray ID, for example, a random number generated with a predetermined algorithm. The program thus generated describes a process for outputting information as the foregoing site in the client apparatus 200, the information indicating the one or more pieces of data that are made available to the target user, that is, that are assigned with the tray ID. The program also describes a process for acquiring and displaying information indicating that new available document data is present, the process being performed in a case where the document-provision setting unit 110 newly acquires target-user identification information and document-data designation information. This causes the icon 1100 to be displayed in the client apparatus 200.

The tray transmission unit 150 transmits the program (data-group acquisition information for acquiring one or more pieces of data made available) generated by the tray generation unit 140 to the client apparatus 200, that is, the target user.

The document-data transmission unit 160 transmits document data held in the document-data holding unit 180 to the client apparatus 200 on the basis of a document-data transmission request received from the client apparatus 200 that displays the tray.

Specifically, upon receiving the document-data transmission request including a tray ID and a document ID from a document-data reception unit 240 (described later) of the client apparatus 200, the document-data transmission unit 160 refers to the tray-association information accumulated in the tray-association holding unit 170 and checks whether the designated document ID has been associated with the received tray ID, that is, whether the designated document data has been made available to the corresponding user. The document-data transmission unit 160 also refers to the acquisition flag to check whether the user has already acquired the designated document data.

If the designated document data has been made available to the user but has not yet been acquired, the document-data transmission unit 160 acquires the corresponding document data from the document-data holding unit 180 and transmits the document data to the client apparatus 200. If the designated document data has not been made available to the user or has already been acquired, the document-data transmission unit 160 transmits, to the client apparatus 200, a notification indicating the content to that effect.

The client apparatus 200 will be described. The client apparatus 200 includes a tray reception unit 210, a document-provision-notification reception unit 220, a tray processing unit 230, the document-data reception unit 240, and a document-data output unit 250. The tray reception unit 210, the document-provision-notification reception unit 220, the tray processing unit 230, the document-data reception unit 240, and the document-data output unit 250 are implemented as functions of a CPU 204 run by a program stored in a memory 205 (not illustrated).

The tray reception unit 210 receives the program for displaying the icon 1000 or 1100, the program being transmitted from the tray transmission unit 150 of the server apparatus 100. The tray reception unit 210 outputs the program to the tray processing unit 230.

The document-provision-notification reception unit 220 receives a document-provision notification transmitted from the document-provision-notification transmission unit 130 of the server apparatus 100 and outputs the document-provision notification to the tray processing unit 230.

The tray processing unit 230 runs the program for displaying the icon 1000 or 1100 received by the tray reception unit 210 and displays the icon 1000 or 1100 on the display screen of the client apparatus 200. In response to a click on the icon 1100, the tray processing unit 230 accesses the tray and displays a list of pieces of document data yet to be acquired (unacquired document data) on the display screen. In accordance with an operation of selecting one of the pieces of document data in the unacquired-document-data list, the tray processing unit 230 outputs a document-data reception instruction to the document-data reception unit 240. Further, if the document-provision-notification reception unit 220 receives the document-provision notification, the tray processing unit 230 displays the icon 1100 indicating that new available document data is present.

The document-data reception unit 240 transmits a document-data transmission request to the server apparatus 100 in response to the document-data reception instruction input from the tray processing unit 230 and receives the document data transmitted from the server apparatus 100 in response to the document-data transmission request. The document-data reception unit 240 outputs the received document data to the document-data output unit 250.

The document-data output unit 250 outputs the document data received by the document-data reception unit 240, for example, by displaying the document data on the display screen of the client apparatus 200 or by storing the document data in a storage medium.

Figure 4:
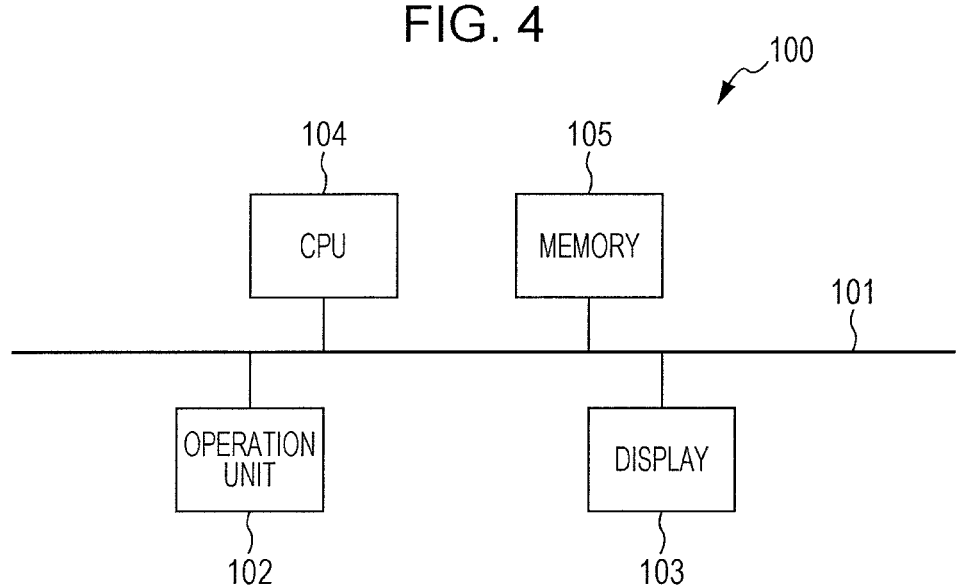
FIG. 4 is a diagram illustrating the hardware configuration of the server apparatus according to the first exemplary embodiment of the invention.

FIG. 4 is a diagram illustrating the hardware configuration of the server apparatus 100 according to the first exemplary embodiment of the invention. The server apparatus 100 includes an operation unit 102, a display 103, the CPU 104, and the memory 105 that are mutually connected through a bus 101. The operation unit 102 includes a keyboard, a mouse, and other components and receives an operation performed by an operator of the server apparatus 100. The display 103 is a display such as a liquid crystal display. The CPU 104 is run by the program stored in the memory 105. The memory 105 includes a memory device such as a hard disk or a memory.

Figure 5:
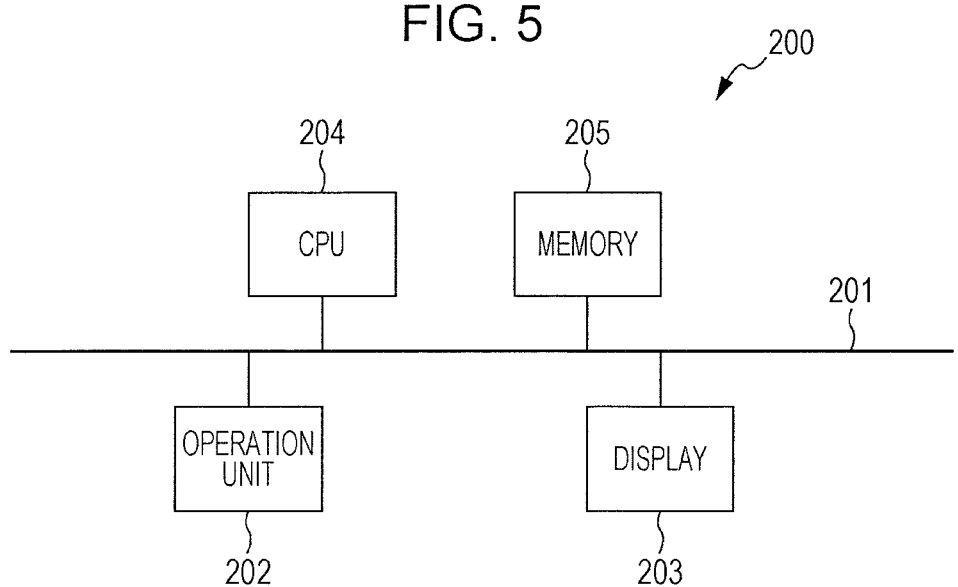
FIG. 5 is a diagram illustrating the hardware configuration of a client apparatus according to the first exemplary embodiment of the invention.

FIG. 5 is a diagram illustrating the hardware configuration of the client apparatus 200 according to the first exemplary embodiment of the invention. The client apparatus 200 includes an operation unit 202, a display 203, the CPU 204, and the memory 205 that are mutually connected through a bus 201. The operation unit 202 includes a keyboard, a mouse, and other components and receives an operation performed by an operator of the client apparatus 200. The display 203 is a display such as a liquid crystal display. The CPU 204 is run by the program stored in the memory 205. The memory 205 includes a memory device such as a hard disk or a memory.

Figure 6:
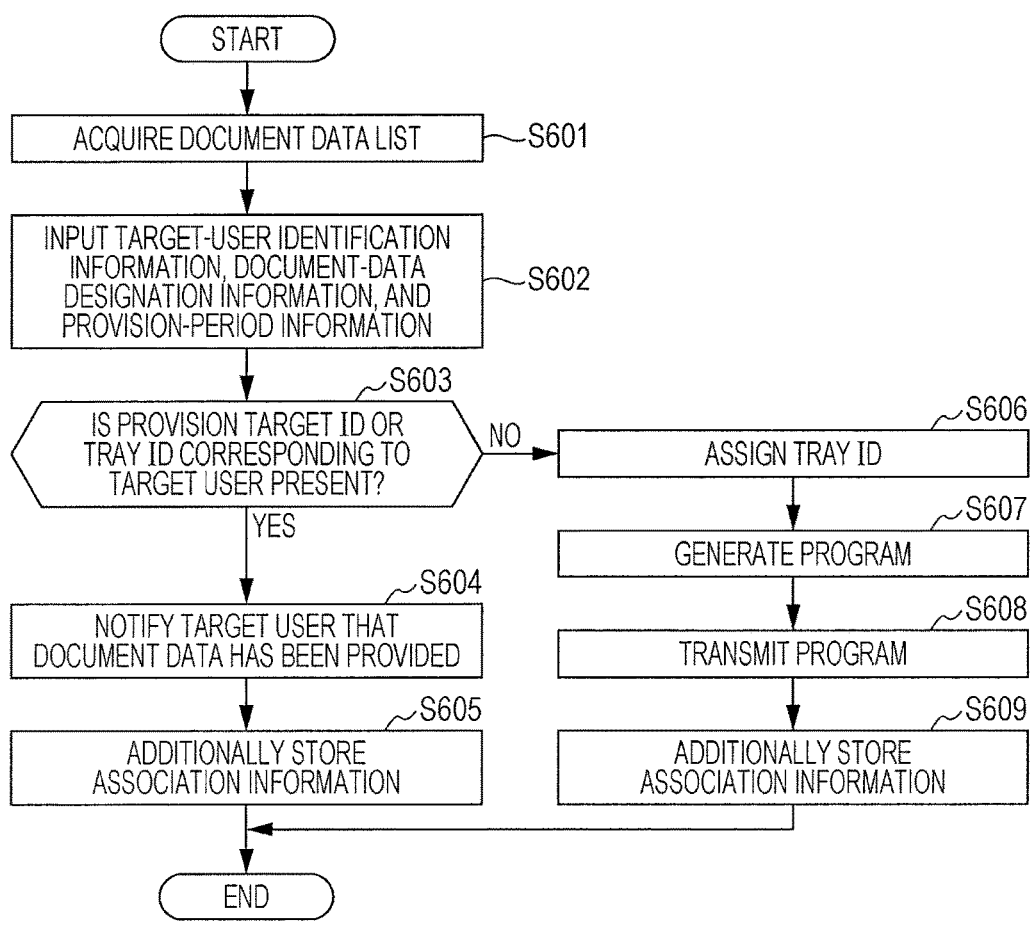
FIG. 6 is a flowchart illustrating a document-data-provision setting process performed by the data management system according to the first exemplary embodiment of the invention.

Operation of the data management system 10 according to the first exemplary embodiment of the invention will be described using a flowchart. FIG. 6 is a flowchart illustrating a document-data-provision setting process performed by the data management system 10 according to the first exemplary embodiment of the invention.

A document-data provider who operates the server apparatus 100 acquires a list of pieces of document data held in the document-data holding unit 180, by operating the server apparatus 100 (S601).

The document-data provider refers to the document data list thus acquired and inputs target-user identification information identifying a target user to whom document data is made available, document-data designation information designating the document data made available, and provision-period information indicating a period within which the document data is available (S602).

The tray-association management unit 120 refers to the tray-association information stored in the tray-association holding unit 170 and determines whether a tray ID corresponding to the target user identified by the target-user identification information is stored in the tray-association information (S603). If the tray ID is stored, the document-provision-notification transmission unit 130 notifies the target user that the document data has been made available (S604). The tray-association management unit 120 additionally stores, in the tray-association holding unit 170, association information in which the tray ID is associated with an ID of the document data newly made available (S605).

If it is determined in step S603 that the tray ID is not stored, the tray-association management unit 120 assigns a tray ID to the document data made available to the user identified by the target-user identification information acquired in step S602 (S606). The tray generation unit 140 generates a program for acquiring the one or more pieces of data that are assigned the tray ID (S607). The tray transmission unit 150 transmits the program generated in step S607 to the client apparatus 200 (S608).

The tray-association management unit 120 additionally stores, in the tray-association holding unit 170, association information in which the provision target ID or the tray ID is associated with the ID of the document data newly made available (S609). The document-data-provision setting process is then terminated.

Figure 7:
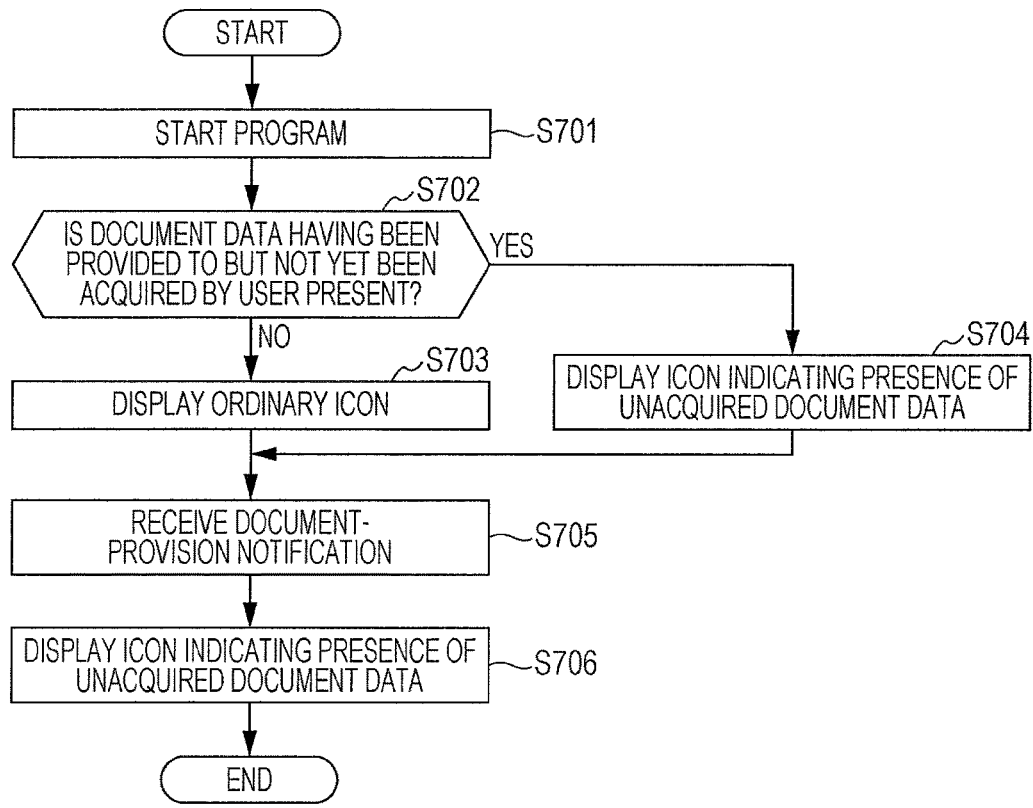
FIG. 7 is a flowchart illustrating a document-data new-arrival notification process performed by the data management system according to the first exemplary embodiment of the invention.

FIG. 7 is a flowchart illustrating a document-data new-arrival notification process performed by the data management system 10 according to the first exemplary embodiment of the invention.

In response to an operation of a user who operates the client apparatus 200, the tray processing unit 230 of the client apparatus 200 starts the program for displaying the icon 1000 or 1100 (S701).

After starting the program, the tray processing unit 230 acquires a file for displaying a list of pieces of document data made available to the user and determines whether document data that has already been made available to but not yet been acquired by the user is present in the list (S702). If no unacquired document data is present, the tray processing unit 230 displays the ordinary icon 1000 (S703). If unacquired document data is present, the tray processing unit 230 displays the icon 1100 indicating that unacquired document data is present (S704).

After the document-provision-notification reception unit 220 receives a document-provision notification (S705), the tray processing unit 230 displays the icon 1100 indicating that unacquired document data is present (S706). After these steps, the document-data new-arrival notification process is terminated.

Figure 8:
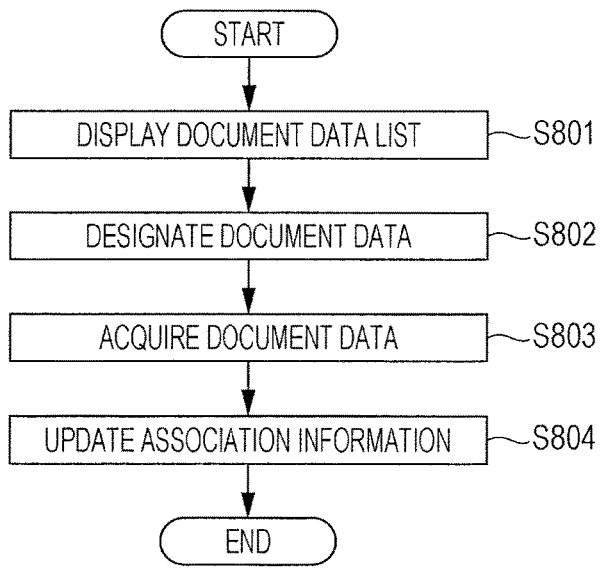
FIG. 8 is a flowchart illustrating a document-data acquisition process performed by the data management system according to the first exemplary embodiment of the invention.

FIG. 8 is a flowchart illustrating a document-data acquisition process performed by the data management system 10 according to the first exemplary embodiment of the invention.

In response to an operation performed by the user who operates the client apparatus 200, the tray processing unit 230 of the client apparatus 200 displays the list of pieces of document data made available to the user by accessing the site where the list is displayed (S801). After the user designates any one of the unacquired pieces of document data (S802), the document-data reception unit 240 acquires the designated piece of document data from the server apparatus 100 (S803). The tray-association management unit 120 of the server apparatus 100 updates the acquisition flag in the corresponding association information to "Done" (S804), and the document-data acquisition process is then terminated.

According to the configuration described above, there is provided the data management system 10 including the server apparatus 100 that operates in the following manner. When data is made available to a user, the server apparatus 100 acquires target-user identification information and document-data designation information. If the user designated by the target-user identification information has been associated with data-group identification information, the server apparatus 100 transmits a data provision notification to the user. If the user has not been associated with data-group identification information, the server apparatus 100 associates the user with data-group identification information and transmits the data-group identification information to the user.

Second Exemplary Embodiment

Figure 9:
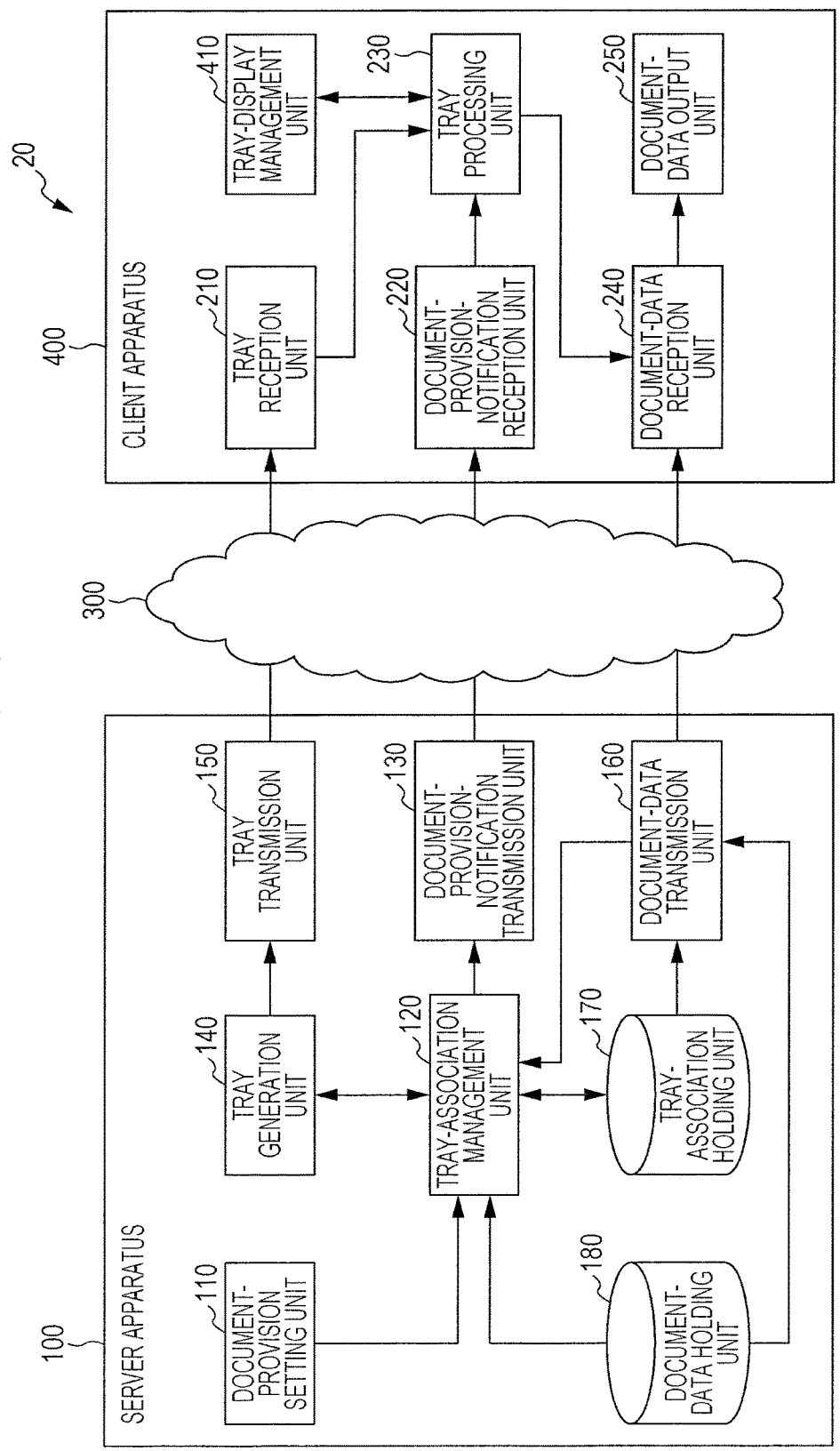
FIG. 9 is a diagram illustrating a data management system according to a second exemplary embodiment of the invention.

FIG. 9 is a diagram illustrating a data management system 20 according to a second exemplary embodiment of the invention. Hereinafter, only a configuration different from the configuration in the first exemplary embodiment will be described.

A client apparatus 400 according to the second exemplary embodiment includes a tray-display management unit 410. When the tray processing unit 230 displays a list of pieces of document data made available to a user, the tray-display management unit 410 refers to provision periods set for the respective pieces of document data made available to the user and controls the tray processing unit 230 not to include any piece of expired document data in the list.

Figure 10:
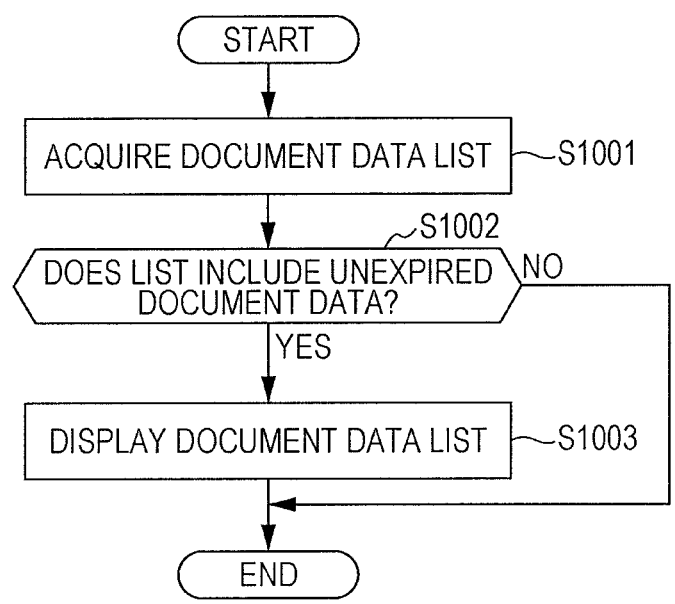
FIG. 10 is a flowchart illustrating part of a document-data-list display process performed by the data management system according to the second exemplary embodiment of the invention.

FIG. 10 is a flowchart illustrating part of a document-data-list display process performed by the data management system 20 according to the second exemplary embodiment of the invention.

When the tray processing unit 230 acquires, in the document-data-list display process, a file for displaying a list of pieces of document data made available but unacquired (S1001), the tray-display management unit 410 refers to the file and determines whether one or more pieces of unexpired document data are included in the pieces of document data in the list (S1002). If one or more pieces of unexpired document data are included, the tray-display management unit 410 displays a list of the one or more pieces of unexpired document data (S1003).

According to the configuration described above, there is provided the data management system 20 including the client apparatus 400 that displays a list of pieces of unexpired document data among pieces of document data set with the respective provision periods.

Third Exemplary Embodiment

Figure 11:
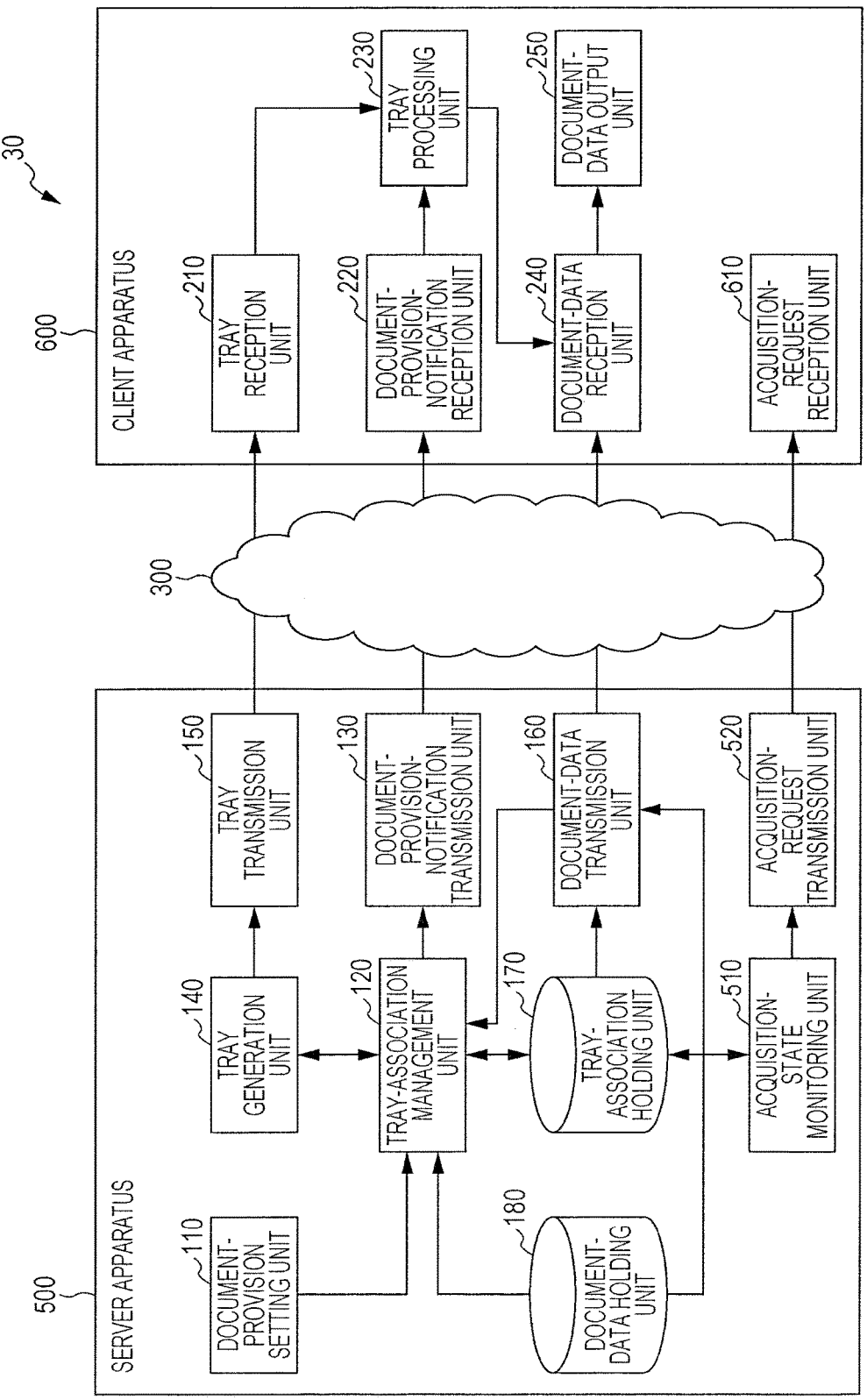
FIG. 11 is a diagram illustrating a data management system according to a third exemplary embodiment of the invention.

FIG. 11 is a diagram illustrating a data management system 30 according to a third exemplary embodiment of the invention. Hereinafter, only a configuration different from the configurations in the first and second exemplary embodiments will be described.

A server apparatus 500 according to the third exemplary embodiment includes an acquisition-state monitoring unit 510 and an acquisition-request transmission unit 520. A client apparatus 600 according to the third exemplary embodiment includes an acquisition-request reception unit 610.

The acquisition-state monitoring unit 510 of the server apparatus 500, at a predetermined timing, refers to the tray-association information held in the tray-association holding unit 170 and checks whether a predetermined period has passed since the date set for providing document data and whether the document data has not yet been acquired (hereinafter, the document data in such a state is referred to as unacquired predetermined-period-old document data), that is, checks whether unacquired predetermined-period-old document data is present.

If the acquisition-state monitoring unit 510 determines that unacquired predetermined-period-old document data is present, the acquisition-request transmission unit 520 transmits an acquisition request to the client apparatus 600.

Upon receiving the acquisition request from the acquisition-request transmission unit 520 of the server apparatus 500, the acquisition-request reception unit 610 of the client apparatus 600 requests the user of the client apparatus 600 to acquire the document data, for example, by displaying a message indicating a request for document-data acquisition on the display screen of the client apparatus 600.

Figure 12:
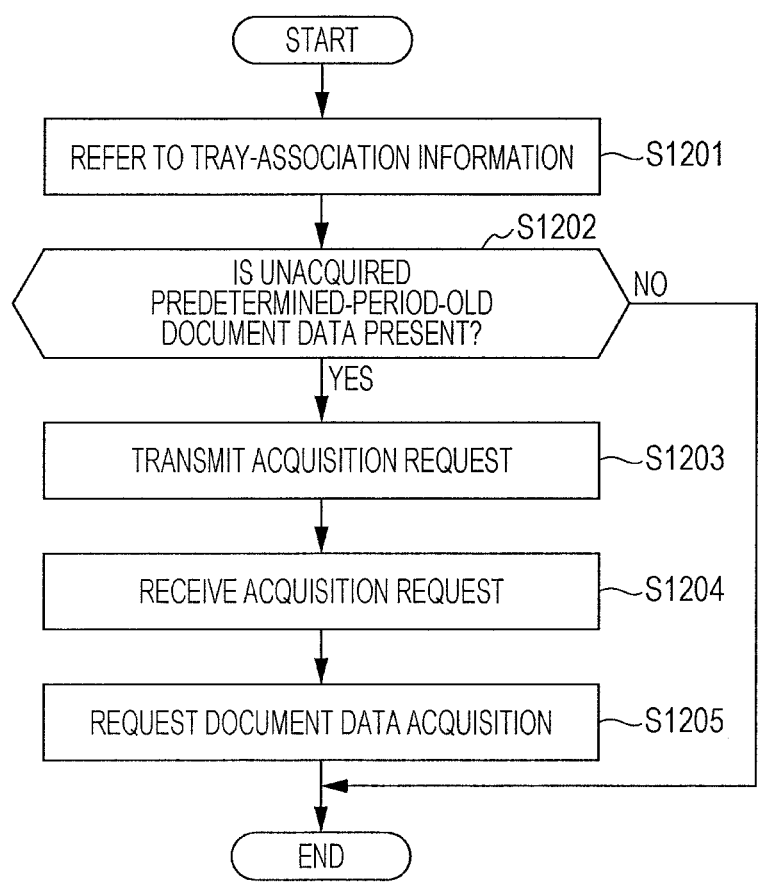
FIG. 12 is a flowchart illustrating a document-data-acquisition request process performed by the data management system according to the third exemplary embodiment of the invention.

FIG. 12 is a flowchart illustrating a document-data-acquisition request process performed by the data management system 30 according to the third exemplary embodiment of the invention.

The acquisition-state monitoring unit 510 of the server apparatus 500 refers to the tray-association information held in the tray-association holding unit 170 at a predetermined timing (S1201) and determines whether unacquired predetermined-period-old document data is present (S1202).

If the acquisition-state monitoring unit 510 determines that unacquired predetermined-period-old document data is present, the acquisition-request transmission unit 520 transmits an acquisition request to the client apparatus 600 (S1203).

Upon receiving the acquisition request transmitted from the acquisition-request transmission unit 520 of the server apparatus 500 (S1204), the acquisition-request reception unit 610 of the client apparatus 600 requests the user of the client apparatus 600 to acquire the document data (S1205).

According to the configuration described above, there is provided the data management system 30 including the client apparatus 600 that requests, in a case where unacquired predetermined-period-old document data is present, the user of the client apparatus 600 to acquire the document data.

Fourth Exemplary Embodiment

Figure 13:
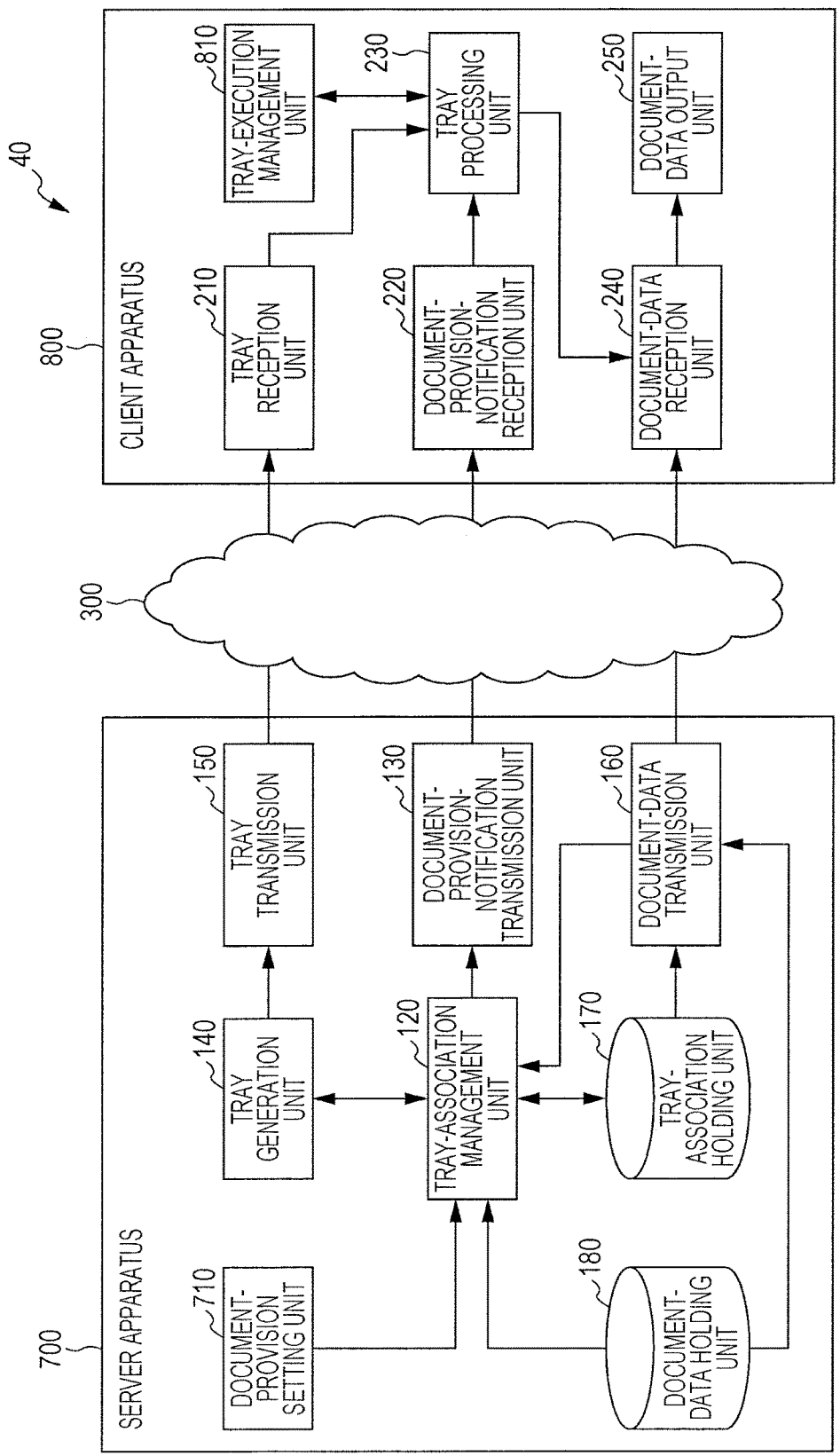
FIG. 13 is a diagram illustrating a data management system according to a fourth exemplary embodiment of the invention.

FIG. 13 is a diagram illustrating a data management system 40 according to a fourth exemplary embodiment of the invention. Hereinafter, only a configuration different from the configurations in the first to third exemplary embodiments will be described.

When setting the provision of document data, a document-provision setting unit 710 of a server apparatus 700 according to the fourth exemplary embodiment sets a date and time for the provision (hereinafter, referred to as a provision date and time). A client apparatus 800 includes a tray-execution management unit 810.

The tray-execution management unit 810 of the client apparatus 800 acquires provision date-and-time information that indicates the date and time set for providing the document data, for example, when a tray is displayed. The tray-execution management unit 810 controls the tray processing unit 230 to start the tray on the set date and time.

Figure 14:
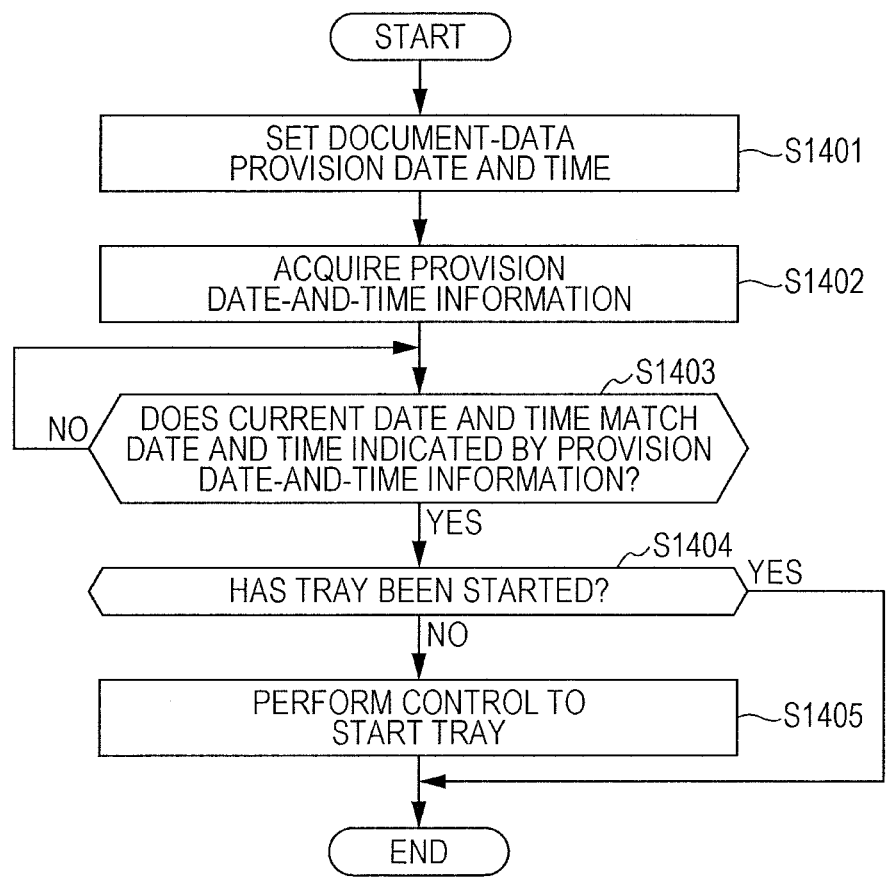
FIG. 14 is a flowchart illustrating a tray-execution management process performed by the data management system according to the fourth exemplary embodiment of the invention.

FIG. 14 is a flowchart illustrating a tray-execution management process performed by the data management system 40 according to the fourth exemplary embodiment of the invention.

The document-provision setting unit 710 of the server apparatus 700 sets a document-data provision date and time (S1401). The tray-execution management unit 810 of the client apparatus 800 acquires provision date-and-time information (S1402). The tray-execution management unit 810 subsequently determines, at a predetermined timing, whether the current date and time matches the date and time indicated by the provision date-and-time information (S1403).

If the current date and time matches the date and time indicated by the provision date-and-time information, the tray-execution management unit 810 determines whether the tray has been started (S1404). If the tray has not been started, the tray-execution management unit 810 controls the tray processing unit 230 to start the tray on the set date and time (S1405).

According to the configuration described above, there is provided the data management system 40 including the client apparatus 800 that starts the tray on the provision date and time set for document data.

Fifth Exemplary Embodiment

Figure 15:
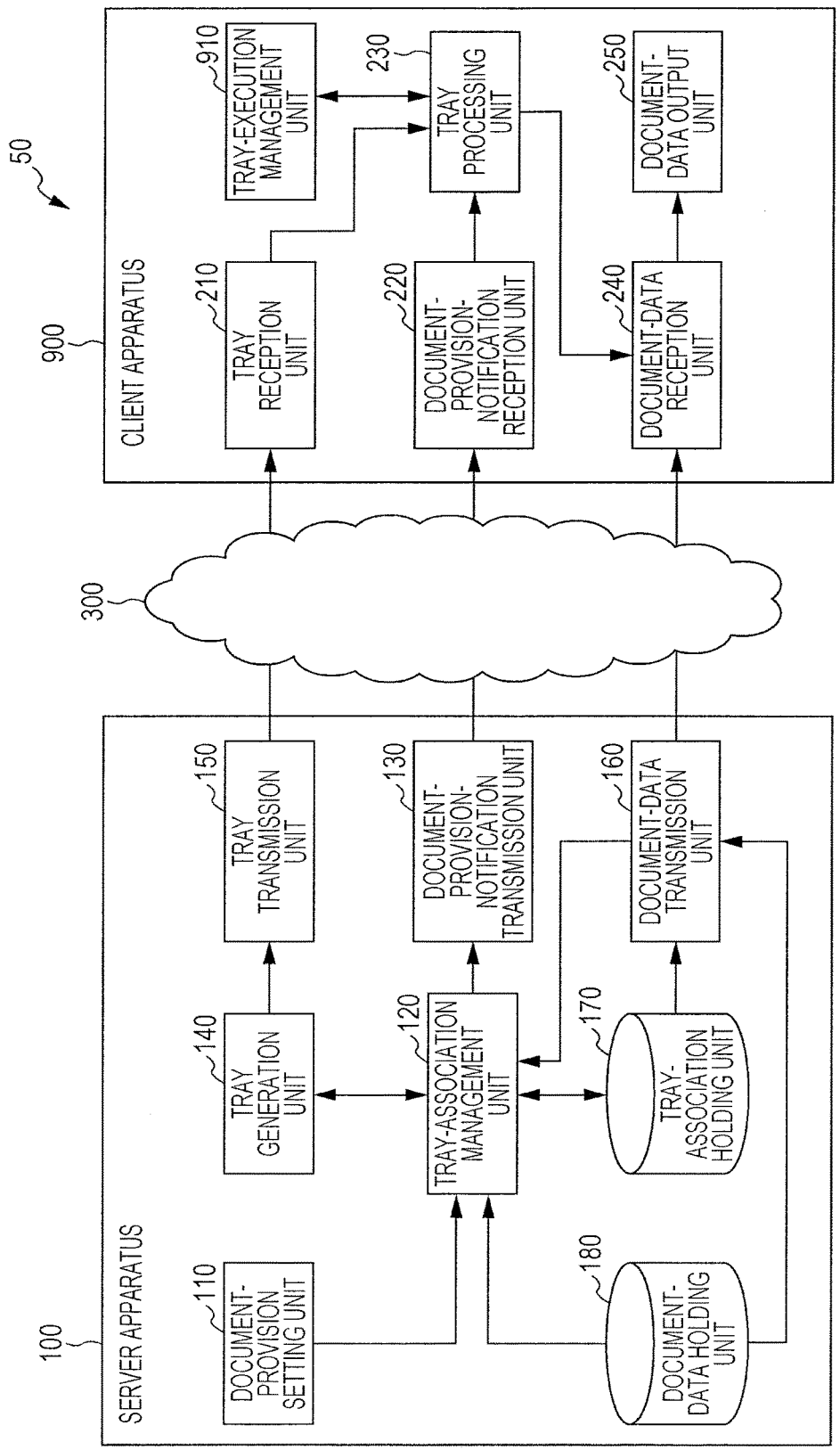
FIG. 15 is a diagram illustrating a data management system according to a fifth exemplary embodiment of the invention.

FIG. 15 is a diagram illustrating a data management system 50 according to a fifth exemplary embodiment of the invention. Hereinafter, only a configuration different from the configurations in the first to fourth exemplary embodiments will be described.

A client apparatus 900 according to the fifth exemplary embodiment includes a tray-execution management unit 910.

If the user performs a tray-display termination operation in a case where unacquired document data is present, the tray-execution management unit 910 of the client apparatus 900 restrains execution of a tray-display termination process, for example, by displaying a warning.

Figure 16:
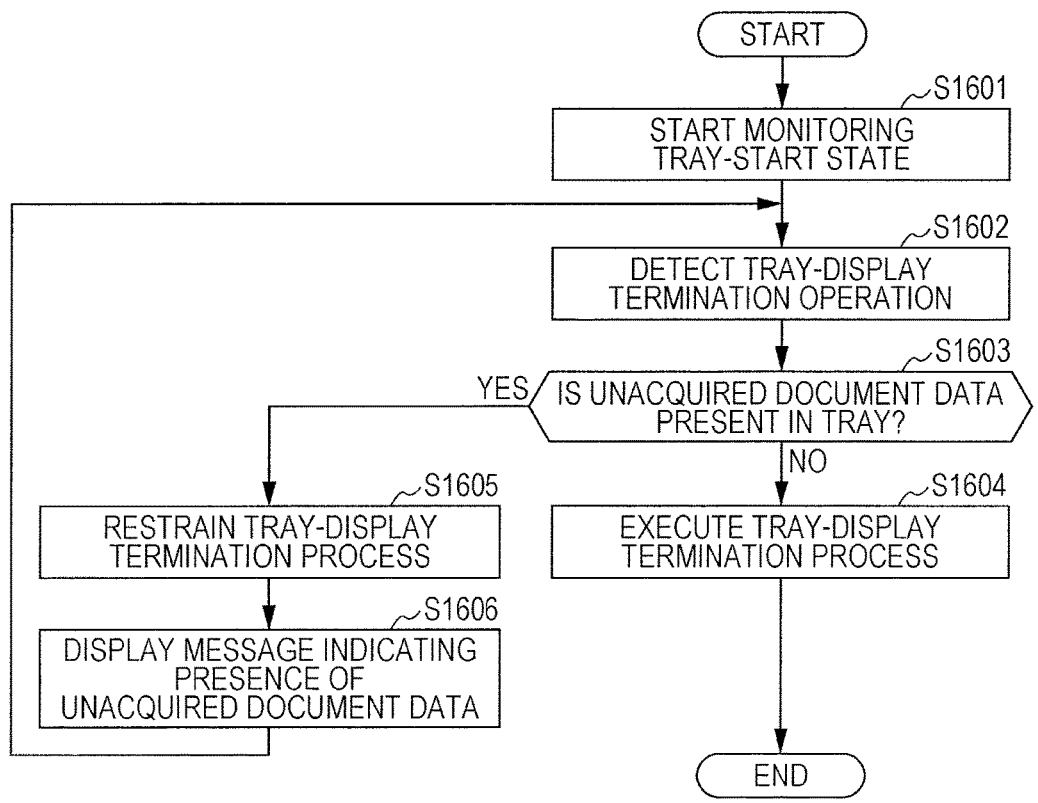
FIG. 16 is a flowchart illustrating how the data management system according to the fifth exemplary embodiment of the invention operates in response to a tray-display termination operation.

FIG. 16 is a flowchart illustrating how the data management system 50 according to the fifth exemplary embodiment of the invention operates in response to a tray-display termination operation.

When displaying of the tray is started, the tray-execution management unit 910 of the client apparatus 900 starts monitoring the start state of the tray (S1601). When a tray-display termination operation is detected (S1602), the tray-execution management unit 910 determines whether unacquired document data is present in the tray (S1603).

If the tray-execution management unit 910 does not determine in step S1603 that unacquired document data is present, the tray-execution management unit 910 does not restrain the tray-display termination process, and the tray processing unit 230 terminates the displaying of the tray (S1604). If the tray-execution management unit 910 determines that unacquired document data is present, the tray-execution management unit 910 restrains the tray-display termination process (S1605) and displays a message indicating that unacquired document data is present (S1606).

According to the configuration described above, there is provided the data management system 50 including the client apparatus 900 that restrains the tray-display termination process in a case where unacquired document data is present.

Note that the present invention is not limited to the exemplary embodiments described above. It goes without saying that the present invention includes a mode modified without departing from the gist of the invention. For example, although the exemplary embodiments described above are the data management systems 10, 20, 30, 40, and 50 that each provide document data, the present invention is not limited to these and also includes another system that provides a user with information registered in advance, processes, and services.

In the exemplary embodiments described above, the configurations are described in which displaying, providing, and the like of document data are performed on the client apparatuses 200, 400, 600, 800, and 900 on the basis of whether document data has been acquired. However, an acquisition state may further be displayed in (output to) the server apparatuses 100, 500, and 700 at a predetermined timing or when a predetermined time passes after the date set for providing document data.

In the configuration described as a process based on a period of time that has elapsed after the date set for providing document data in one of the exemplary embodiments, an acquisition request is made after a predetermined period of time has elapsed. However, variations may be made to the mode of display. For example, a document displayed in the icon 1100 may turn yellowish.

The data management systems 10, 20, 30, 40, and 50 including the server apparatuses 100, 500, and 700 and the client apparatuses 200, 400, 600, 800, and 900 have been described in the foregoing exemplary embodiments. However, the functions implemented by the respective components may be implemented by one component, or part of the function of one component may be implemented by another component.

Note that the operation of each of the server apparatuses 100, 500, and 700 and the client apparatuses 200, 400, 600, 800, and 900 that are described above is implemented by running the program stored in the corresponding memory. The program may be provided through communications or in such a manner as to be stored in a computer readable storage medium such as a compact disc read-only memory (CD-ROM).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data management system comprising:
   an information management apparatus including a first processor configured to execute an acquisition unit, a first transmission unit, and a second transmission unit; and
   an information processing apparatus including a second processor configured to execute a first reception unit and a second reception unit, the first reception unit being configured to receive data-group identification information from the information management apparatus, the second reception unit being configured to receive a data provision notification from the information management apparatus,
   wherein the acquisition unit is configured to acquire target-user identification information identifying a target user to whom at least one piece of data is newly available and to acquire the piece of data newly available to the target user, the target user corresponding to the information processing apparatus,
   wherein the first transmission unit is configured to transmit, in response to the first reception unit not having received the data-group identification information assigned to one or more pieces of data available to at least one user, the data-group identification information to the information processing apparatus of the target user,
   wherein the second transmission unit is configured to transmit, in response to the first transmission unit having transmitted the data-group identification information to the information processing apparatus of the target user, the data provision notification to the information processing apparatus, the data provision notification notifying the target user that the piece of data is newly available,
   wherein the information processing apparatus further includes a display controller configured to display an icon and to display, in response to the target user operating the icon, a list of pieces of data available to the target user, the list including the newly available piece of data,
   wherein the icon includes a tray, a document within the tray corresponding to the newly available piece of data, and in response to an other piece of data being previously made available to the target user, an other document within the tray corresponding to the previously available other piece of data, and
   wherein the other document corresponding to the previously available other piece of data is displayed in a manner that is visibly distinguishable from the document corresponding to the newly available piece of data,
   wherein the first processor is further configured to execute:
      an acquisition-state monitoring unit configured to determine whether a predetermined period has passed after the second transmission unit has transmitted the data provision notification; and
      an acquisition-request transmission unit configured to transmit, in response to the acquisition-state monitoring unit determining that the predetermined period has passed, an acquisition request to the information processing apparatus, and
   wherein the display controller of the information processing apparatus is configured to display, in response to receipt of the acquisition request, a message indicating receipt of the acquisition request.

2. An information management apparatus comprising:
   a processor configured to execute:
      an acquisition unit configured to acquire target-user identification information identifying a target user to whom at least one piece of data is newly available and to acquire the piece of data newly available to the target user, the target user corresponding to an information processing apparatus;
      a first transmission unit configured to transmit, in response to the information processing apparatus not having received data-group identification information assigned to one or more pieces of data available to at least one user, the data-group identification information to the information processing apparatus of the target user; and
      a second transmission unit configured to transmit, in response to the first transmission unit having transmitted the data-group identification information to the information processing apparatus of the target user, a data provision notification to the information processing apparatus, the data provision notification notifying the target user that the piece of data is newly available, wherein the information processing apparatus is configured to display an icon and to display, in response to the target user operating the icon, a list of pieces of data available to the target user, the list including the newly available piece of data, wherein the icon includes a tray, a document within the tray corresponding to the newly available piece of data, and in response to an other piece of data being previously made available to the target user, an other document within the tray corresponding to the previously available other piece of data, and wherein the other document corresponding to the previously available other piece of data is displayed in a manner that is visibly distinguishable from the document corresponding to the newly available piece of data, wherein the processor is further configured to execute:
  an acquisition-state monitoring unit configured to determine whether a predetermined period has passed after the second transmission unit has transmitted the data provision notification; and
  an acquisition-request transmission unit configured to transmit, in response to the acquisition-state monitoring unit determining that the predetermined period has passed, an acquisition request to the information processing apparatus.

3. A non-transitory computer readable medium storing a program causing a computer to execute a process for information management, the process comprising:
  acquiring target-user identification information identifying a target user to whom at least one piece of data is newly available and acquiring the piece of data newly available to the target user, the target user corresponding to an information processing apparatus;
  transmitting, in response to the information processing apparatus not having received data-group identification information assigned to one or more pieces of data available to at least one user, the data-group identification information to the information processing apparatus of the target user; and
  transmitting, in response to a transmission of the data-group identification information to the information processing apparatus of the target user, a data provision notification to the information processing apparatus, the data provision notification notifying the target user that the piece of data is newly available, wherein the information processing apparatus is configured to display an icon and to display, in response to the target user operating the icon, a list of pieces of data available to the target user, the list including the newly available piece of data, wherein the icon includes a tray, a document within the tray corresponding to the newly available piece of data, and in response to an other piece of data being previously made available to the target user, an other document within the tray corresponding to the previously available other piece of data, and wherein the other document corresponding to the previously available other piece of data is displayed in a manner that is visibly distinguishable from the document corresponding to the newly available piece of data, wherein the process further comprises:

determining whether a predetermined period has passed after the second transmission unit has transmitted the data provision notification; and transmitting, in response to determining that the predetermined period has passed, an acquisition request to the information processing apparatus.

* * * * *